Figure 6:
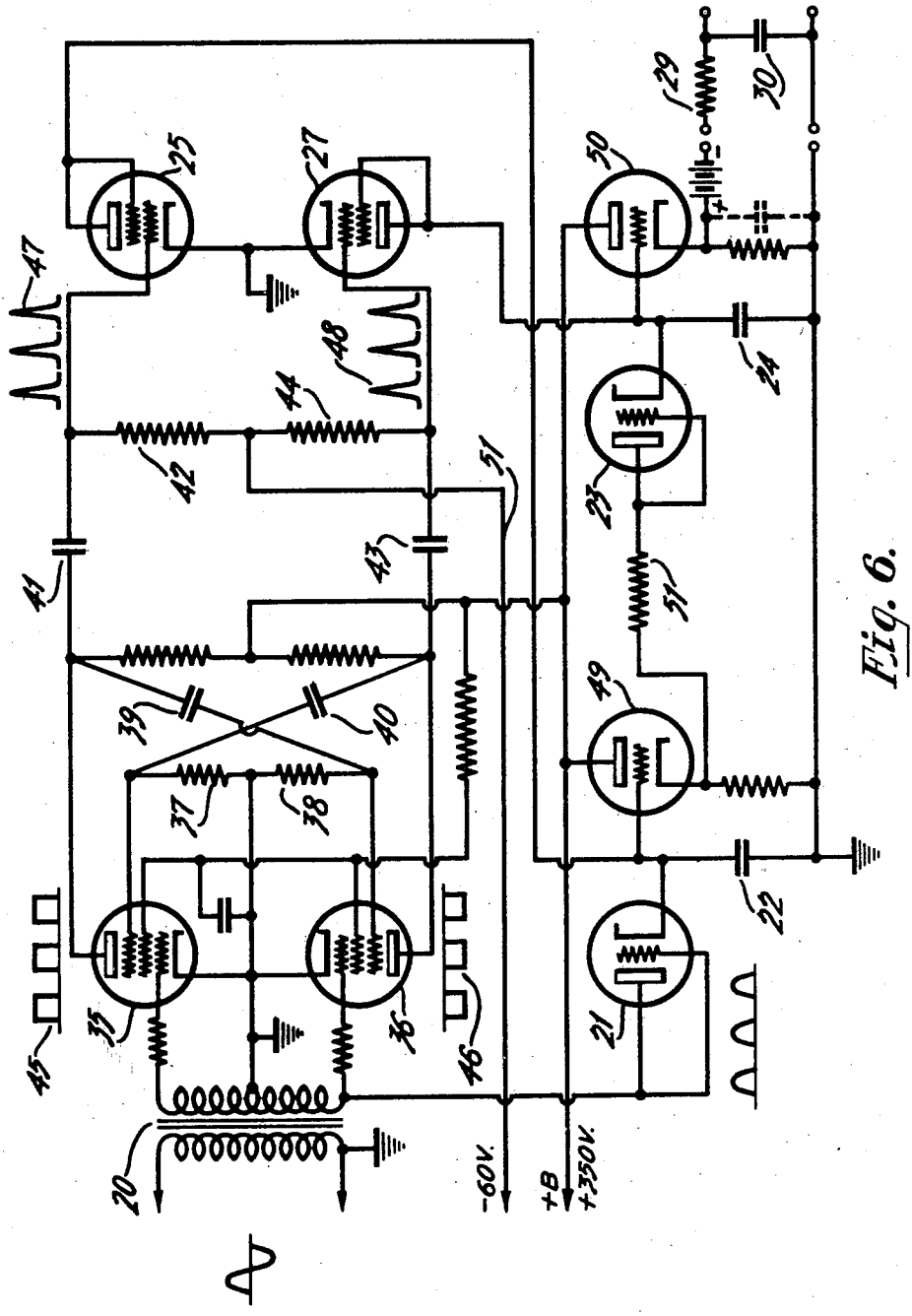

Dec. 14, 1948.   J. R. COONEY   2,456,050
ELECTRICAL CIRCUITS
Filed April 12, 1945   4 Sheets-Sheet 1
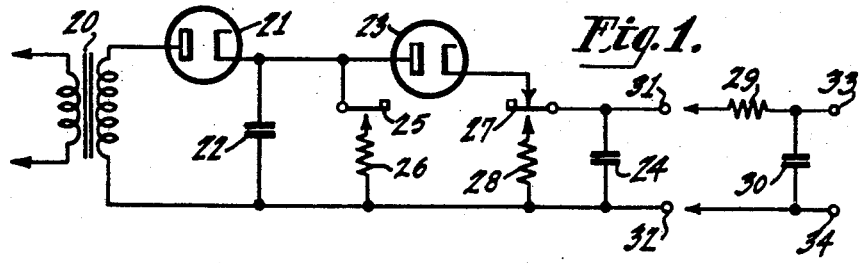
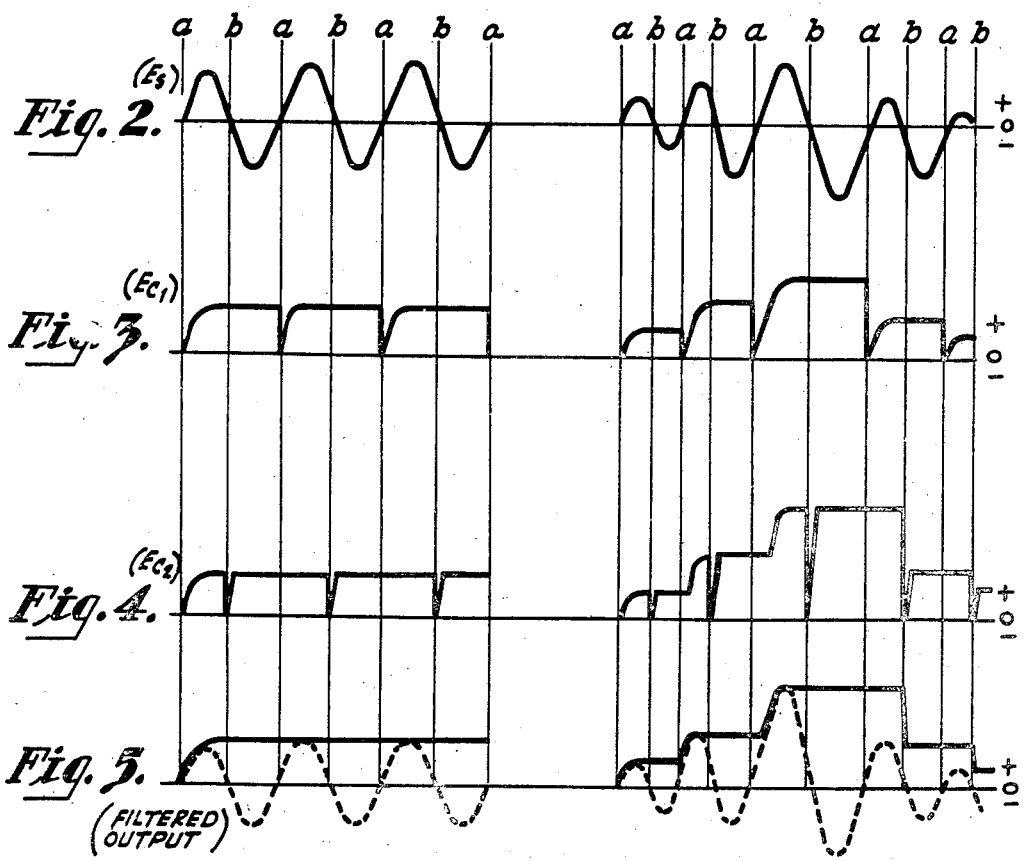
INVENTOR.
John R. Cooney
BY
ATTORNEY.

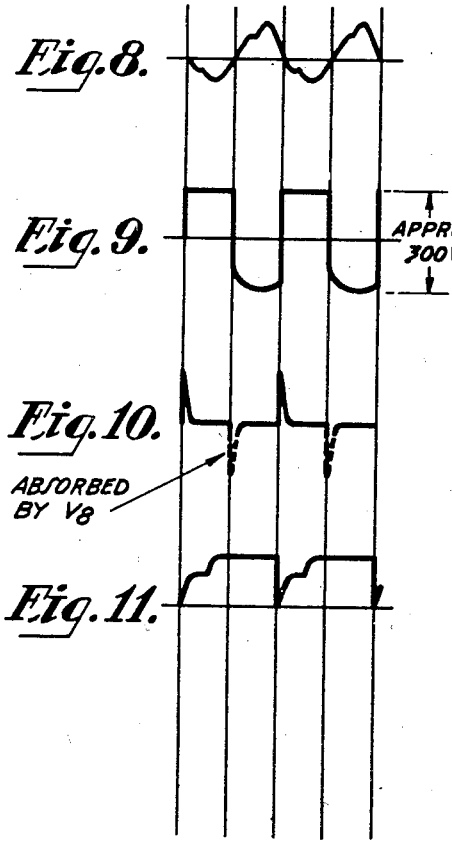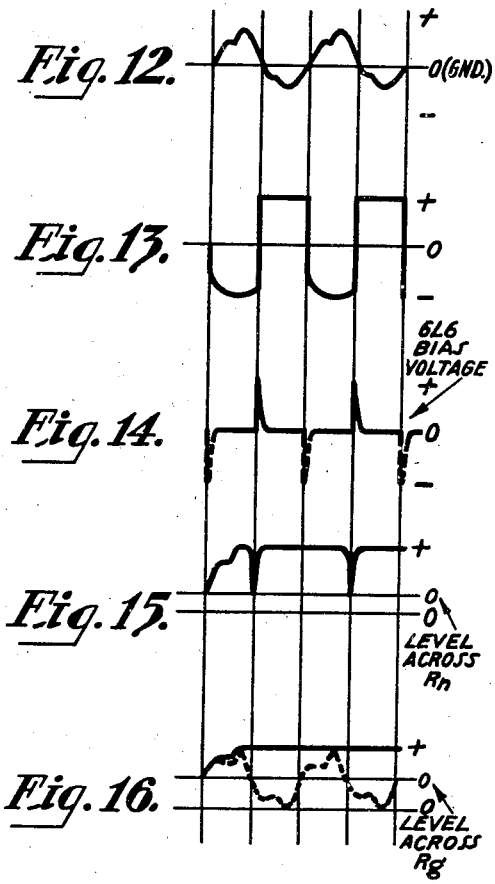

Patented Dec. 14, 1948

2,456,050

UNITED STATES PATENT OFFICE 2,456,050

ELECTRICAL CIRCUITS

John R. Cooney, Waldoboro, Maine

Application April 12, 1945, Serial No. 588,011

8 Claims. (Cl. 175—363)

This invention relates to electrical circuits, such as are utilized to derive a unidirectional voltage proportional to the peak value of an alternating voltage, and has for its principal object the provision of an improved apparatus and method of operation whereby such unidirectional voltage is rendered free of its usual ripple component and is made to respond very quickly and very accurately to an increase in the amplitude of the alternating voltage and to respond with a predetermined time delay in response to a decrease in this amplitude.

In the achievement of this object, the alternating voltage is rectified and utilized to charge different capacitors. These capacitors are so interconnected that the first of them is discharged at the beginning of the positive half-cycle of the alternating voltage and the second is discharged at the beginning of the negative half-cycle of the alternating voltage.

During the negative half-cycle of the alternating voltage, the first capacitor is maintained charged to the peak value of the alternating voltage and the second capacitor, which is much smaller than the first capacitor, is maintained charged to the peak value of the immediately preceding positive half-cycle. At the end of the negative half-cycle of the alternating voltage, the first capacitor is discharged. During the next positive half-cycle of the alternating voltage, the first capacitor is charged to the peak voltage of this half-cycle. This peak voltage is also applied to the second capacitor which may be at a lower or higher voltage depending on the voltage of the last preceding positive half-cycle. At the beginning of the next negative half-cycle, the second capacitor is discharged and is immediately recharged from the first capacitor to the peak voltage of the last positive half-cycle as previously explained.

In order to ensure that the first capacitor is always charged to the peak voltage of the preceding positive half-cycle, it is made of small capacity and is charged through a low resistance transformer and rectifier. As already indicated, the second capacitor is made sufficiently small to permit it to be charged to the peak voltage without appreciably reducing the voltage of the first capacitor. Under the circumstances, (1) the unidirectional output voltage increases very rapidly in response to increase in the peak value of the alternating voltage, (2) is maintained at the peak value of the preceding positive half-cycle for one-half cycle after a decrease in the peak value of the alternating voltage, and (3) decreases very rapidly at the end of this half-cycle.

Important objects of the invention are the provision of means for deriving a unidirectional voltage output which is more nearly proportional to the peak value of an alternating voltage input that has been realized heretofore; and the provision of an alternating voltage peak responsive circuit which (1) responds to an increase in such peak voltage without appreciable time delay and (2) responds similarly to a decrease in such peak voltage after a predetermined time delay.

The invention will be better understood from the following description considered in connection with the accompanying drawings and its scope is indicated by the appended claims.

Figure 7:
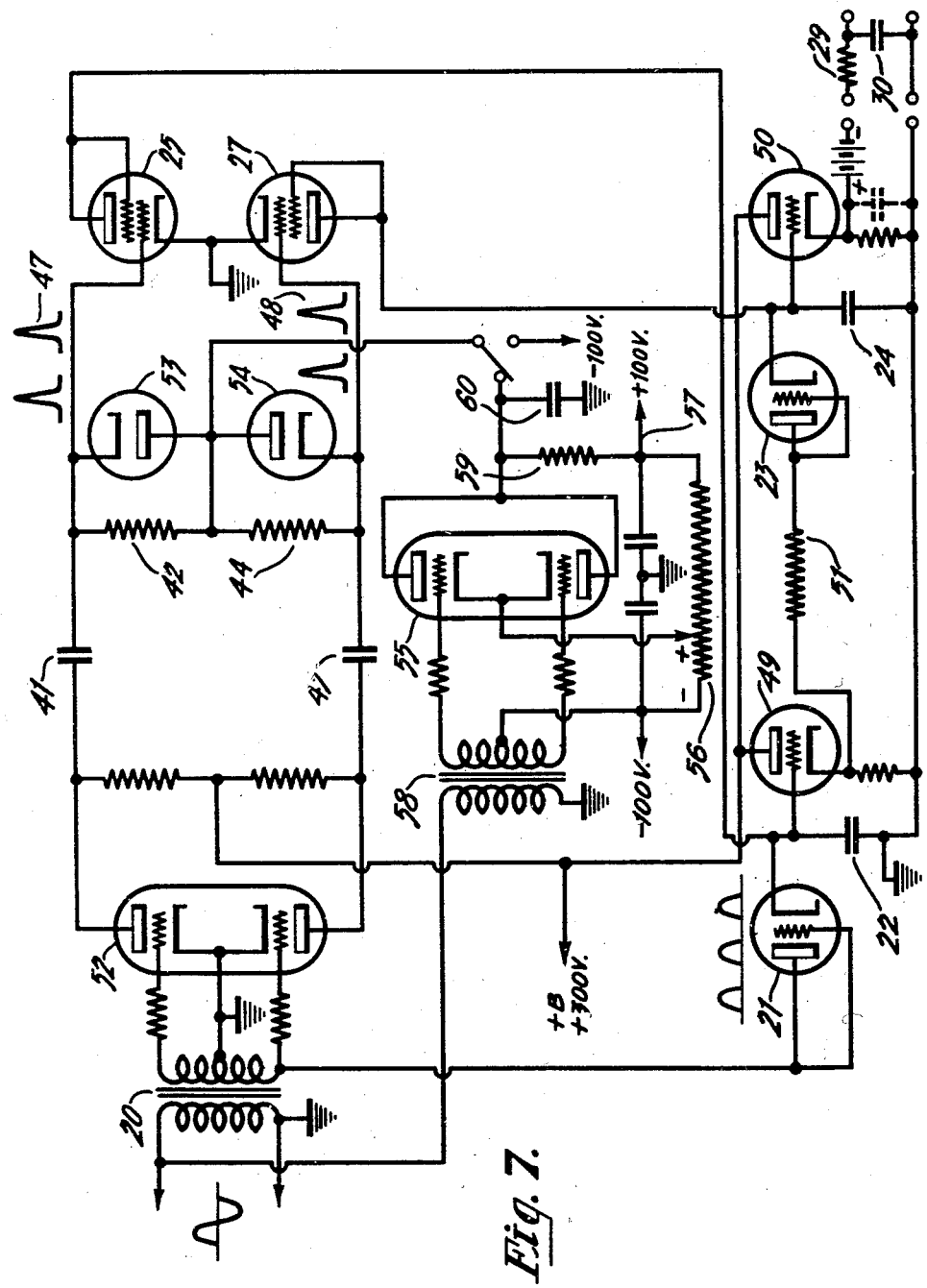

Referring to the drawings:

Figure 1 is a wiring diagram of a simplified circuit illustrating the essential elements of the invention, Figures 2 to 5 are explanatory curves relating to the operation of the circuit illustrated by Fig. 1, Figure 6 is a wiring diagram of a preferred embodiment of the invention, Figure 7 is a wiring diagram of another embodiment of the invention, and Figures 8 to 16 are explanatory curves relating to the operation of the circuit of Fig. 7.

The simplified circuit of Fig. 1 includes an alternating voltage input transformer 20, the secondary winding of which is connected through a rectifier 21 to a first capacitor 22 and through the rectifier 21 and a rectifier 23 to a second capacitor 24. Connected in shunt to the capacitor 22 is a switch 25 for discharging it through a resistor 26. Likewise connected in shunt to the capacitor 24 is a switch 27 for discharging it through a resistor 28. A filter 29—30 may be provided in the output circuit if desired. Unidirectional voltage proportional to the peak value of the alternating voltage input is delivered either at the terminals 31—32 or at the terminals 33—34.

Thus assuming the alternating input voltage wave to be a simple sine wave of constant amplitude as indicated by the left-hand part of Fig. 2 or of variable amplitude as indicated by the right-hand part of Fig. 2, the capacitor 22 to be completely discharged by momentarily closing the switch 25 at the points $a$ of the wave and the capacitor 24 to be completely discharged by momentarily closing the switch 27 at the points $b$ of the wave, the potential of the capacitor 22 varies as indicated by the left-hand curve of Fig. 3 in the case of a constant amplitude signal and by the right-hand curve of Fig. 3 in the case of a variable amplitude signal. The output potential at the terminals of the capacitor 24 varies as indicated by the left-hand curve of Fig. 4 in the case of a constant amplitude signal and as indicated by the right-hand curve of Fig. 4 in the case of a variable amplitude signal. If the filter 29—30 is included in the circuit, the output potential is as indicated by the full line curve of Fig. 5. It will be noted that the output curve reaches the peak value of the alternating input voltage very quickly when this value increases but does not follow a decrease in this value until the end of the next half cycle. These curves are copied from oscillograms taken during operation of the modifications of Figs. 6 and 7 which are hereinafter explained. During such operation, the capacities of the capacitors 22 and 24 were respectively 0.001 mfd. and 0.0002 mfd. The capacitor discharge path in both cases was about 1,000 ohms, and the sine wave input had a frequency of 400 cycles.

If the sine wave input has a constant amplitude, as indicated by the left-hand part of Fig. 2, it is evident that the switches 25 and 27 (and the corresponding switches of Figs. 6 and 7) would be superfluous for the reason that a simple rectifier and capacitor without any bleeder resistor would be a satisfactory means of producing a unidirectional voltage proportional to peak value of the alternating potential applied to the input circuit of the apparatus. The sine wave of constant amplitude, however, is considered only for explanatory purposes. Such constant amplitude waves are seldom, if ever, encountered for any considerable period of time in the case of audio frequency waves.

It is well known that the amplitude of audio waves changes almost continuously. It is the function of the present invention to produce a substantially instantaneous rise in the unidirectional output voltage when the peak value of the alternating input voltage rises and to delay change in the unidirectional output voltage for one half cycle when the peak value of the amplitude of the alternating input voltage decreases. This is illustrated by the right-hand curves of Figs. 2 to 5. It will be noted that the first cycle of Fig. 2 produces an output potential which increases to and is maintained at a constant value as indicated by Fig. 4. The second cycle of Fig. 2 is of greater amplitude than the first and produces a corresponding rise in the output voltage of Fig. 4. The third cycle of Fig. 2 is of greater amplitude than the second and produces a corresponding rise in the output voltage of Fig. 4. The fourth cycle of Fig. 2 is of lower amplitude than the third but the output voltage of Fig. 4 decreases only after a delay of one half cycle when the switch 27 is closed at the point b, as previously explained. It thus follows that change in the value of the unidirectional output is always delayed for one half cycle when the peak value of the alternating input potential decreases. It is apparent that this result is altogether dependent on the operation of the switches 25 and 27 at the times indicated and can not be produced by the rectifiers alone. As is well known, this result is useful in various processes such as the photographic recording of sound where a shutter or other instrumentality is utilized to maintain the transparent area of the record at the lowest value required to accommodate the volume of the recorded sound.

This is so because (1) the capacitor 22 is charged through a low resistance transformer winding and a low resistance rectifier so that it is charged to the peak voltage of the positive half wave, (2) the capacities of the capacitors 22 and 24 are so related that charging of the capacitor 24 from the capacitor 22 does not appreciably reduce the voltage of the capacitor 22, (3) the capacitor 22 is discharged through the switch 25 and the resistor 26 at the end of each negative half cycle, and (4) the capacitor 24 is discharged through the switch 27 and the resistor 28 at the end of each positive half cycle.

Thus, if a positive half cycle of one peak value is followed by a positive half cycle of a lower peak value, the charge produced on the capacitor 24 by the higher positive peak is maintained during the half cycle of lower peak value. After this delay of one half cycle, however, the switch 27 closes and the capacitor 24 is discharged. This condition is exemplified in Figs 2 to 5 by the two full cycles preceding the last positive half cycle at the right of these figures.

From a practical viewpoint, the simplified circuit of Fig. 1 has certain limitatons. In the first place, it includes no suitable means for operating the switches 25 and 27 at the required speed. In the second place, it includes no means for ensuring that the capacitors 22 and 24 are completely discharged when the input voltage terminates suddenly. Practical operation of the circuit requires that the switches operate at the frequency of the input voltage and that the capacitors be completely discharged when the input voltage is first applied. This is accomplished by the circuit of Fig. 6.

The lower part of Fig. 6 corresponds to Fig. 1 but differs therefrom in that the capacitor discharge switches are in the form of triodes 25 and 27, a cathode follower 49 is provided for isolating the capacitor 24 and its charging circuit 23—51 from the capacitor 22, and a cathode follower 50 is likewise interposed between the capacitor 24 and the output circuit. The upper part of Fig. 6 is a control circuit by means of which the capacitors are discharged at the proper times and are maintained in a discharged condition, after a sudden interruption of the input voltage, until the input voltage is re-established.

This control circuit includes a multivibrator 35—36—37—38—39—40 which oscillates at a relatively low frequency, determined by the values of the resistors 37 and 38 and the capacitors 39 and 40, when no alternating potential is applied to the input transformer 20. When alternating voltage is applied to the input transformer 20, this oscillator action ceases and the control circuit is operated at the frequency of the input voltage.

In either case, there are impressed on the differentiating circuits 41—42 and 43—44 square voltage pulses such as those indicated at 45 and 46. The output of these differentiating circuits is in the form of sharp peaks (indicated at 47 and 48) which are applied to the triodes 25 and 27 at the proper times for discharging the capacitors 22 and 24 as previously described. Bias potential is applied through a lead 61 for normally biasing the switching tubes 25 and 27 well beyond cut-off so that they are conductive only for a very short interval of time.

In the circuit of Fig. 6, the capacitor 24 and its charging system are isolated from the capacitor 22 by the cathode follower 49. A cathode follower 50 is also interposed between the capacitor 24 and the output circuit.

It is evident that the voltage applied to the rectifier 21 is always zero at the moment the capacitor 22 is discharged through the switching triode 25. This is not true of the rectifier 23. Instead of attempting to disconnect the capacitor 24 while it is being discharged as was done in the case of Fig. 1, this capacitor is made very small and charged through the fairly high resistance of the resistor 51. The time constant of the charging circuit is still small enough to bring the capacitor 24 to its full charge practically instantly and the resistor 51 prevents the cathode follower 49 from being loaded excessively while the capacitor 24 is being discharged through the triode 27 and, at the same time, assures a large enough ratio of the voltage drop of the resistor 51 to the voltage across the triode 27 during the discharge period. Otherwise the operation of the circuit of Fig. 6 is similar to that of the circuit of Fig. 1.

Thus assuming the secondary polarity of the transformer 20 to be such that a positive potential is applied to the grid of the triode 35, (1) the back end of the resultant output wave 45 functions through the differentiator 41—42 to produce a positive pulse 47 at the grid of the triode 25, (2) the capacitor 22 is discharged through the triode 25, and (3) the current of the cathode follower 49 is reduced or interrupted so that the rectifier 23 ceases to conduct current.

During the next half cycle, the grid of the triode 36 is positive, the capacitor 22 is charged through the rectifier 21, and the capacitor 24 is charged through the cathode follower 49 (which has its grid potential applied from the capacitor 22), the resistor 51 and the rectifier 23. At the end of this half cycle (grid of 36 positive), (1) the back end of the output pulse 46 is differentiated by the differentiator 43—44 to produce a positive pulse 48 at the grid of the triode 27, (2) the capacitor 24 is discharged through the triode 27, and (3) the current of the cathode follower 50 is interrupted. During the next half cycle (grid of 35 positive), the capacitor 24 is charged through the cathode follower 49, the resistor 51 and the rectifier 23. At the end of this half cycle, the capacitor 22 is again discharged as previously explained.

The circuit of Fig. 7 is similar to that of Fig. 6 in many respects. the main differences being (1) in the means utilized to derive the voltage by which the switching tubes 25 and 27 are controlled and (2) in the means utilized to ensure that the capacitors 22 and 24 are completely discharged after a sudden cessation of the input voltage. Like parts of Figs. 6 and 7 are indicated by the same reference numerals.

In the circuit of Fig. 7, the tube 52 is a high-$\mu$ twin triode which may be precede by an amplifier (not shown), is driven to saturation by any input voltage above a certain minimum and delivers a substantially constant-amplitude rectangular output which is differentiated, as previously explained in connection with Fig. 6, to form the sharp pulses 47 and 48 by which the capacitors 22 and 24 are discharged through the triodes 25 and 27.

The wave forms of the voltages applied to the control grid of the upper triode of the tube 52, to the differentiator 41—42, and to the control grid of the triode 25 are indicated, respectively, by the curve of Fig. 8, the curve of Fig. 9 and the curve of Fig. 10. The voltage of the capacitor 22 is indicated by the curve of Fig. 11.

The wave forms of the voltages applied to the control grid of the lower triode of the tube 52, to the differentiator 43—44, and to the control grid of the triode 27 are indicated respectively by the curve of Fig. 12, the curve of Fig. 13 and the curve of Fig. 14. The voltage of the capacitor 24 is indicated by the curve of Fig. 15 and that of the output circuit by the curve of Fig. 16.

While the negative pulses of the curves 10 and 14 should theoretically have no effect on the triodes 25 and 27 because they are already cut off when these negative pulses occur, it is advantageous to absorb them by means of the diodes 53 and 54.

For ensuring that the capacitors are completely discharged after a sudden interruption of the input voltage of the transformer 20, there is provided a twin diode 55 which is normally biased to cutoff by the voltage drop of a resistor 56 so that the triodes 25 and 27 are normally biased on by a voltage applied to the lead 57. The application of a certain minimum input voltage to the transformer 20 and to a transformer 58, however, produces in a resistor 59 a voltage drop whereby the tubes 25 and 27 are restored to their normal cut-off condition. The anodes of the tube 55 conduct alternately except for a very short time at cross-over. The positive pulse which tends to appear every half-cycle for this reason is ironed out by a small capacitor 60.

It is thus apparent (1) that the multivibrator oscillator of Fig. 6 is replaced in Fig. 7 by the saturation limiter 52 and by the twin triode 55 through which grid bias potentials of the tubes 25 and 27 are controlled. (2) that the tubes 25 and 27 are biased on periodically at a low frequency in the absence of input voltage to the circuit of Fig. 6. and (3) that the tubes 25 and 27 are continually biased on in the absence of input voltage to the circuit of Fig. 7. In either case the capacitors 22 and 24 are always fully discharged when voltage is applied to the input transformer 20 and the unidirectional output voltage increases as previously explained.

The operaton of the modification of Fig. 7 is similar to that outlined in connection with Fig. 6.

What the invention provides is a system for converting an alternating potential to a unidirectional potential which responds immediately to an increase in the alternating potential amplitude but responds with a predetermined time delay to a decrease in the alternating potential amplitude.

I claim as my invention:

1. The combination of means for applying an alternating voltage, a first capacitor, a second capacitor having a capacitance which is small as compared to that of said first capacitor, means for rectifying said voltage and for applying said rectified voltage to said capacitors. means for discharging said first capacitor at the beginning of each positive half-cycle of said voltage, and means for discharging said second capacitor at the beginning of each negative half-cycle of said voltage whereby the unidirectional voltage output of said device is increased rapidly in response to an increase in the amplitude of said alternating voltages and decreases at a predetermined time after a decrease in the amplitude of said alternating voltage.

2. The combination of means for applying an alternating input voltage, a first capacitor, a second capacitor having a capacitance which is small with respect to that of said first capacitor, means for rectifying said alternating voltage and for applying said rectified voltage to said capacitors, and means responsive to said alternating voltage for discharging said first capacitor at the beginning of each positive half-cycle and for discharging said second capacitor at the beginning of each negative half-cycle of said alternating voltage.

3. The combination of means for applying an alternating input voltage, a first capacitor, a second capacitor, means for rectifying said alternating voltage and for applying said rectified voltage to said capacitors, and means including a multivibrator responsive to said alternating voltage for discharging said capacitors successively in response to successive half-cycles of said alternating voltage and operable as a low frequency oscillation generator for discharging said capacitors in the absence of said alternating voltage.

4. The combination of means for applying an alternating input voltage, a first capacitor, a second capacitor, means for rectifying said alternating voltage and for applying said rectified voltage to said capacitors, and means including differentiating circuits and a pair of triodes controlled by said alternating voltage for discharging said capacitors successively in response to successive half-cycles of said alternating voltage.

5. The combination of means for applying an alternating input voltage, a first capacitor, a second capacitor, means for rectifying said alternating voltage and for applying said rectified voltage to said capacitors, and means including a saturation limiter responsive to said alternating voltage for discharging said capacitors successively in response to successive half-cycles of said alternating voltage.

6. The combination of means for applying an alternating input voltage, a first capacitor, a second capacitor, means for rectifying said alternating voltage and for applying said rectified voltage to said capacitors, means including differentiating circuits and a pair of electron discharge devices controlled by said alternating voltage for discharging said capacitors successively in response to successive cycles of said alternating voltage, and mean for maintaining said electron discharge devices in a conductive condition in the absence of said alternating voltage.

7. The combination of means for applying an alternating input voltage, a first capacitor, a second capacitor, means for rectifying said voltage and for applying said rectified voltage to said capacitors, means for discharging said first capacitor at the beginning of each positive half-cycle of said voltage, means for discharging said second capacitor at the beginning of each negative half-cycle of said voltage, and means for isolating the charging circuit of said second capacitor from said first capacitor.

8. The combination of means for applying an alternating input voltage, a first capacitor, a second capacitor, means for rectifying said voltage and for applying said rectified voltage to said capacitors, means for discharging said first capacitor at the beginning of each positive half-cycle of said voltage, means for discharging said second capacitor at the beginning of each negative half-cycle of said voltage, and means including a cathode follower for isolating the charging circuit of said second capacitor from said first capacitor.

JOHN R. COONEY.

REFERENCES CITED

The following references are of record in the file of this patent:

UNITED STATES PATENTS

| Number | Name | Date |
| --- | --- | --- |
| 1,896,468 | Shoemaker | Feb. 7, 1933 |
| 2,075,120 | Lenehan | Mar. 30, 1937 |
| 2,239,786 | Jones | Apr. 29, 1941 |
| 2,343,285 | Dodington | Mar. 7, 1944 |